United States Patent [19]

Oosterling et al.

[11] 4,426,827

[45] Jan. 24, 1984

[54] MOWING IMPLEMENT

[75] Inventors: Pieter A. Oosterling; Hendricus C. van Staveren, both of Nieuw-Vennep, Netherlands

[73] Assignee: Multinorm, B.V., Nieuw-Vennep, Netherlands

[21] Appl. No.: 77,033

[22] Filed: Sep. 19, 1979

Related U.S. Application Data

[63] Continuation of Ser. No. 878,396, Feb. 16, 1978, abandoned, and a continuation of Ser. No. 805,395, Jun. 10, 1977, abandoned, and a continuation of Ser. No. 739,845, Nov. 9, 1976, abandoned, and a continuation of Ser. No. 536,744, Dec. 27, 1974, abandoned.

[30] Foreign Application Priority Data

Dec. 28, 1973 [NL] Netherlands .......................... 7317813

[51] Int. Cl.³ .............................................. A01D 55/18
[52] U.S. Cl. ..................................................... 56/13.6
[58] Field of Search ................... 56/6, 11.9, 13.6, 13.7, 56/16.2, 295, 192

[56] References Cited

U.S. PATENT DOCUMENTS 3,469,378  9/1969  Heesters et al. ..................... 56/11.9
3,974,630  8/1976  van der Lely ......................... 56/295

Primary Examiner—Jay N. Eskovitz
Attorney, Agent, or Firm—Diller, Ramik & Wight

[57] ABSTRACT

A mowing implement essentially comprising a housing extending transversely of the direction of movement of the mowing implement, a plurality of mowing members rotatably journalled on said housing and a drive assembly arranged within said housing for driving the mowing members and formed by a sequence of gears including both driving gears connected with the moving members and at least four coupling gears drivingly interconnecting each adjacent pair of driving gears. All of the gears are small and are arranged in line so that the housing is narrow. The housing is made very rigid by fixedly interconnecting the top and bottom walls together by structure which supports the bearings for the coupling gears. The assembly is economical so that it can be replaced as a unit rather than being repaired.

15 Claims, 27 Drawing Figures

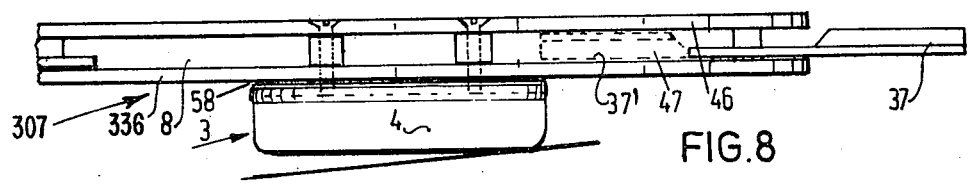
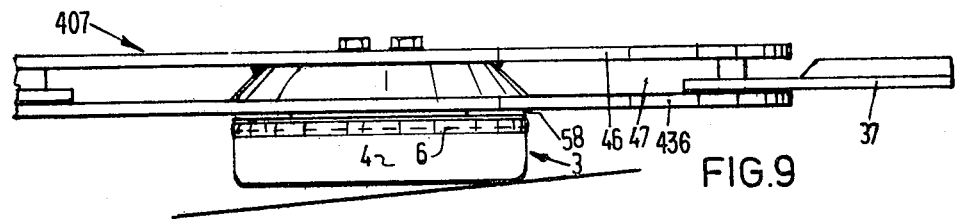
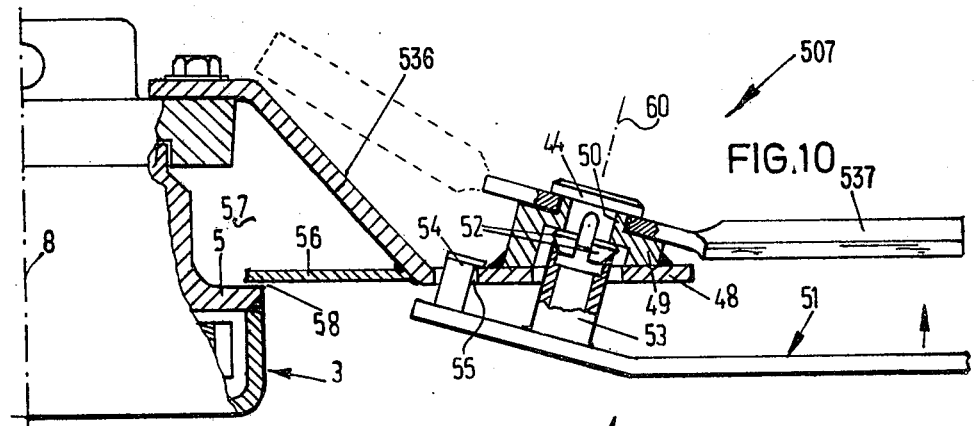
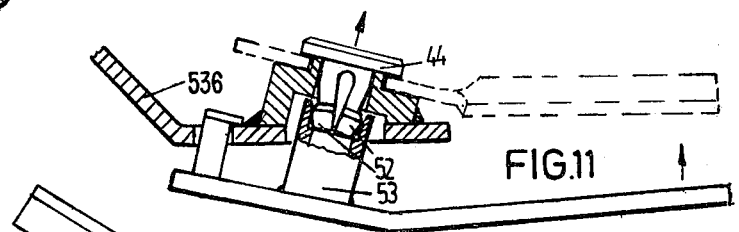
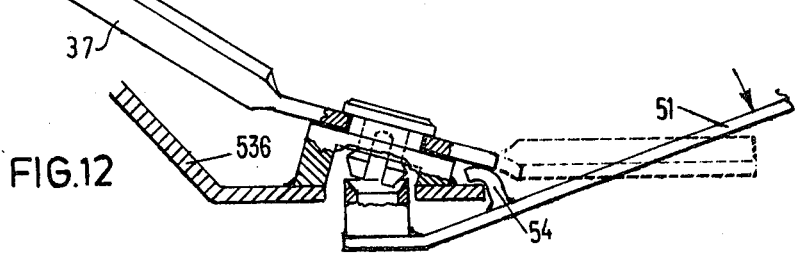

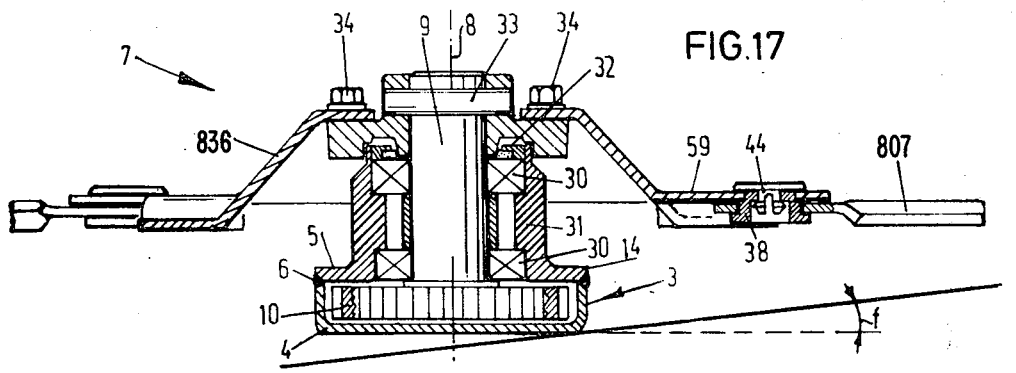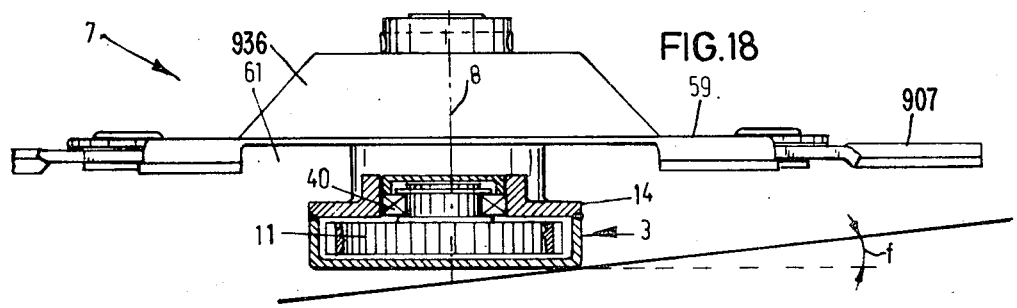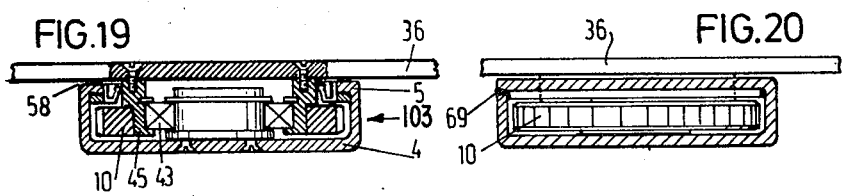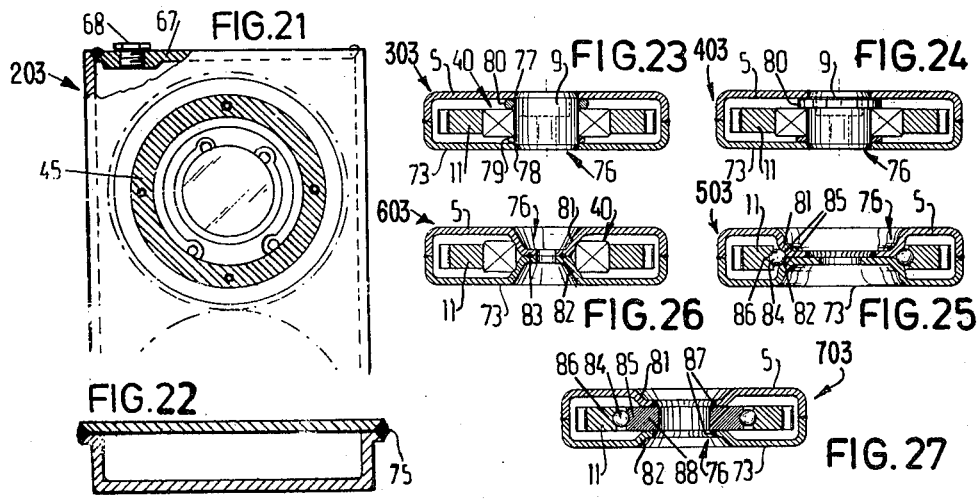

MOWING IMPLEMENT

This is a continuation of Ser. No. 878,396 of Feb. 16, 1978; of 805,395 of June 10, 1977; of Ser. No. 739,845 of Nov. 9, 1976; of Ser. No. 536,744 of Dec. 27, 1974, all abandoned.

The invention relates to a mowing implement essentially comprising a housing extending transversely of the direction of movement of the mowing implement, a plurality of mowing members rotatably journalled on said housing and a driving gear assembly arranged within said housing for driving the mowing members and formed by a sequence of gears including both driving gear wheels connected with mowing members and coupling gears.

The invention has for its object to provide a simple and satisfactorily operating mowing device. For this purpose in accordance with the invention the mowing device of the kind set forth is characterized in that the coupling gears of the driving gears assembly are inaccessibly arranged in the housing and can, therefore, not be dismounted.

The invention provides, moreover, a housing capable of replacing a damaged housing of a mowing implement. Said housing is characterized in that the coupling gear wheels of the driving gear are inaccessibly arranged in the housing so as not to be dismountable. The costs of such a housing are so low that there is no objection to the housing not being dismountable. If a tooth should break off a gear, all gears are damaged and it is, therefore, more advantageous to provide a completely new housing from the factory comprising a driving gear assembly for a mowing implement in accordance with the invention than to replace the gears of the drive of a known mowing implement.

Preferably also the driving gears are inaccessibly arranged in the housing so that replacement is not possible.

In order to manufacture the housing with a minimum of welding operations, the housing is preferably formed from not more than two portions extending in the axial direction of the housing and joined to one another by means of not more than two welding seams extending in an axial direction.

The aforesaid and further features of the invention will become apparent from the folowing description of preferred embodiments of a mowing implement in accordance with the invention.

In the drawings:

FIG. 8 is an elevational view showing a modified form of rotary cutter;

FIG. 9 is an elevational view showing a modified form of rotary cutter;

FIG. 10 is an enlarged, elevational view, partly broken away, of a different mowing implement in accordance with the invention in conjunction with a wrench for dismounting knives;

FIG. 11 shows a detail of FIG. 10 in a different position;

FIG. 12 shows a variant of the detail of FIG. 11;

FIG. 17 is a sectional view illustrating a modified form of drive gear arrangement;

FIG. 18 is a sectional view illustrating a modified form of coupling gear arrangement;

FIG. 19 is a sectional view illustrating a modified form of drive gear arrangement;

FIG. 20 is a sectional view illustrating a modified form of housing;

FIG. 21 is a plan view of the housing of the mowing implement shown in FIG. 19;

FIG. 22 is a sectional view of a different housing of a mowing implement in accordance with the invention; and FIG. 23 is a sectional view illustrating a modified form of bearing support;

FIG. 24 is a sectional view illustrating a modified form of bearing support;

FIG. 25 is a sectional view illustrating a modified form of bearing support;

FIG. 26 is a sectional view illustrating a modified form of bearing support; and FIG. 27 is a sectional view illustrating a modified form of bearing support.

Figure 1:
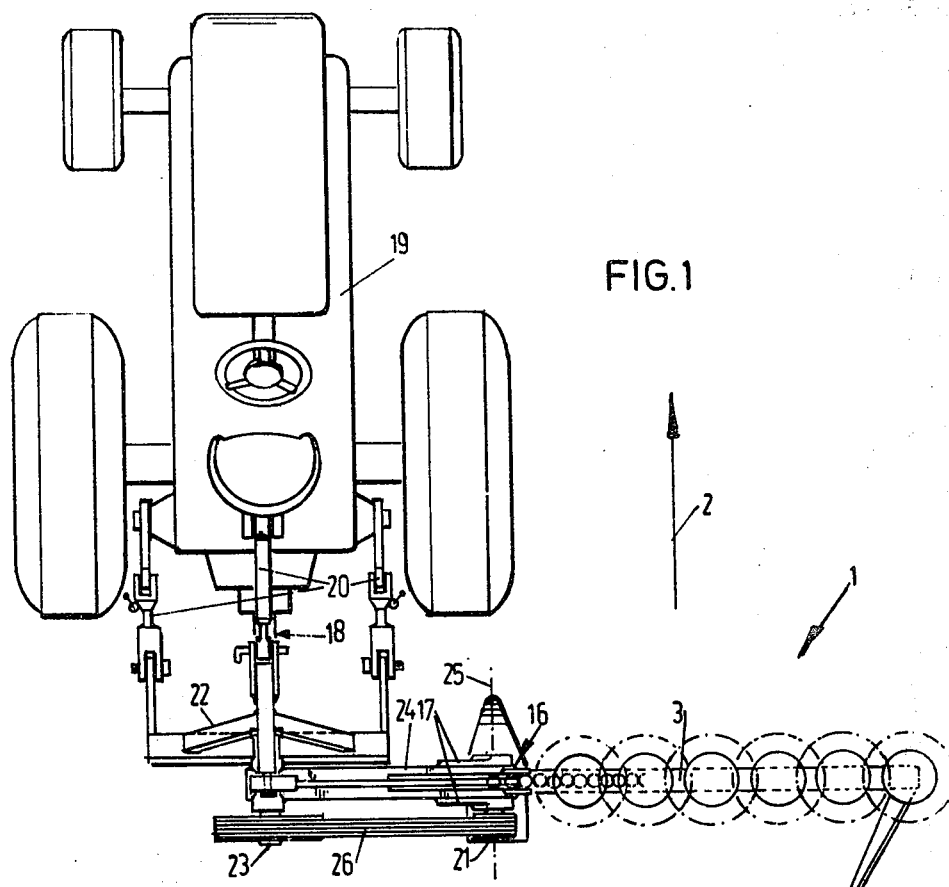
FIG. 1 is a plan view of a tractor with a mowing implement embodying the invention.
Figure 2:
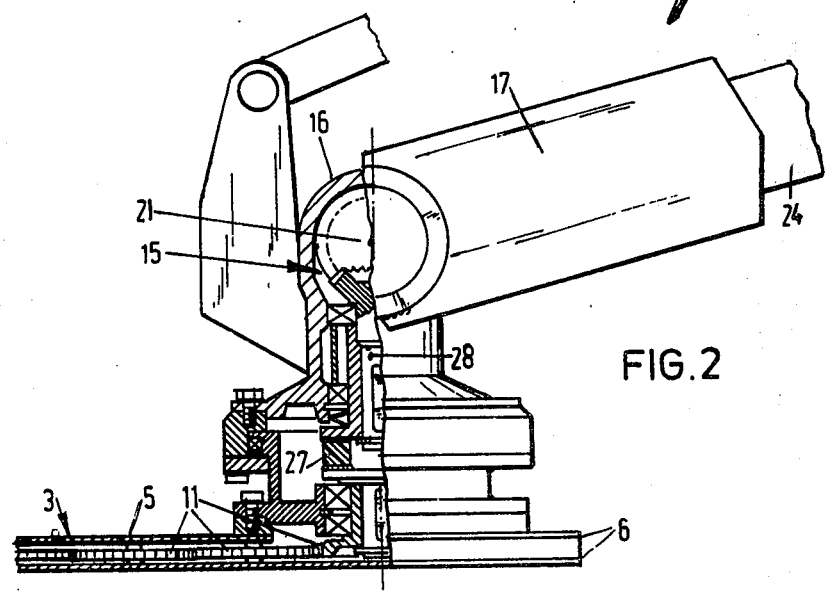
FIG. 2 is a front view, partly broken away, of the mowing implement on an enlarged scale.

As shown in FIG. 1 the mowing implement 1 is connected with a frame 22 suspended from the lifting rods 20 of a tractor 19, in which frame 22 is journalled a driving shaft 23 driven by the power take-off shaft of the tractor 19, energized by the universal shaft 18. An auxiliary frame 24 is adapted to pivot about the horizontal shaft 23 with respect to the frame 22. The auxiliary frame 24 is provided at its other end with two ears 17, arranged to define a horizontal centre line 25 and coaxially to a housing 16 of a bevel gear drive 15. The input shaft 21 of this driving bevel gear 15 is also coaxial to the centre line 25. The shaft 21 is driven through a belt transmission 26 from the driving shaft 23.

The mowing implement 1 according to the invention comprises a housing 3, extending transversely of the direction of movement 2 and shaped in the form of a flat, elongated beam essentially formed by a channel-shaped bottom 4, to which a lid 5 is secured by welds 6. On the housing 3 a plurality of mowing members 7 are rotatably journalled on upright axes 8. The cutting members 7 are arranged near and above the housing 3 and are adapted to rotate pairwise in opposite senses. Each cutting member 7 is rigidly secured by means of a shaft 9 to a driving gear 10 of a drive assembly gear 63 accommodated in the housing 3 and comprised of a series of gears i.e. said gear wheels 10 and coupling gear 11. The coupling gears 11 nearest the tractor 19 is driven through an elastic coupling 27 and a shaft 28 by the bevel gear drive 15.

Figure 4:
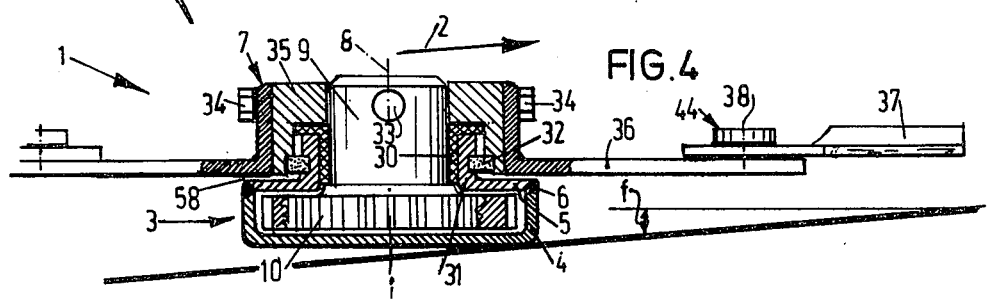
FIG. 4 is a sectional view taken on the line IV—IV in FIG. 3.

Between each pair of gears 10 rotating in opposite senses towards one another, four or two pairs of coupling gears 11 are arranged, each of which is identical with a gear 10. Due to the large number of coupling gears 11 their pitch diameter a is small, for example, 80 mms. Therefore, the required internal width b of the housing is small, for example, 100 mms. It is even possible to arrange three pairs of coupling gears 11 between two gear wheels 10. Since the lid 5 and the trough 4 are welded to one another—instead of having projecting flanges which are screwed together by flanges of the housing 3—the external width c is particularly small, for example, 110 mms. As a result the points of intersection 13 of the mowing circles 12 are located at a large distance d, in front of the uninterrupted, straight front flange or wall 14 of the housing 3. FIG. 4 shows that the shaft 9 of each cutting member 7 is rotatably journalled in an upright collar 31 of the lid 5 by means of a bearing 30. Moreover, a seal 32 is provided between the cutting member 7, connected with the shaft 9 by means of a transverse pin 33, and the collar 31.

Figure 3:
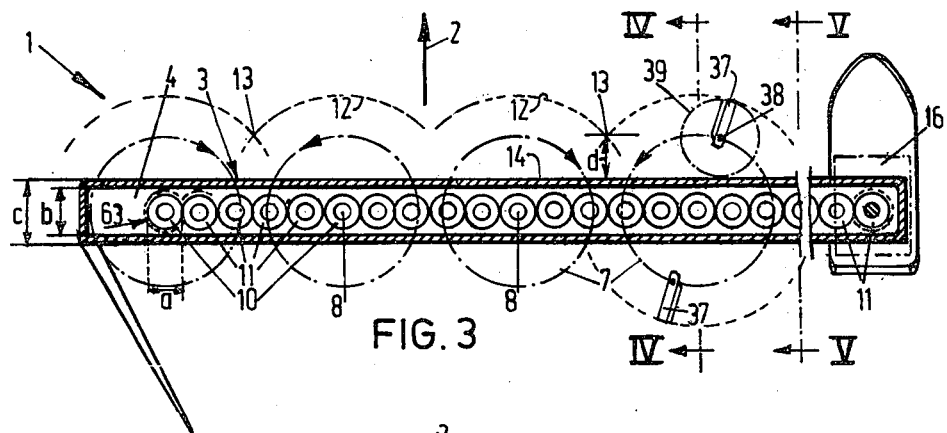
FIG. 3 is a horizontal sectional view of the housing of the driving gear of the mowing implement shown in FIG. 1.

Each cutting member 7 comprises a disc 36, fastened by screws 34 to a hub 35 and forming a holder, to which disc one or more, for example, two cutters 37 are fastened. The cutters 37 adapted to move across adjacent discs 36 without touching the same (FIG. 1). The cutters 37 of adjacent mowing members 7 are relatively off-set through an angle of 90° so that they do not touch one another, although the paths of the cutters 37 overlap one another. Each cutter 37 is freely rotatable about the centerline 38, and is secured to the disc 36 by a longitudinally split, resilient fastening member 44 shown in FIG. 10. The right-hand said of FIG. 4 shows the cutter 37, which is capable of rotating along a circle 39 in FIG. 3 upon collision with a stone with respect to the disc 36 without abutting against any part of the housing 3 or a disc 36.

Figure 5:
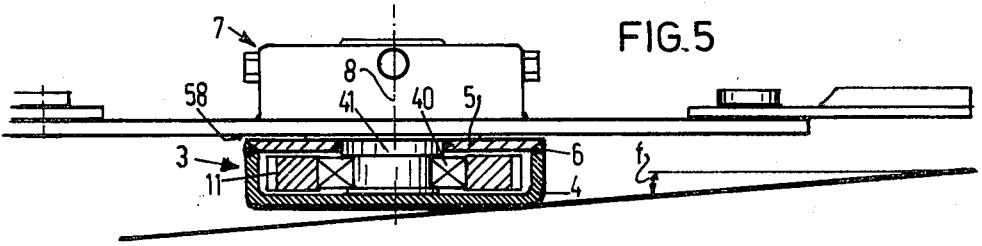
FIG. 5 is a sectional view taken on the line V—V in FIG. 3.

FIG. 5 shows the arrangement of a coupling gear 11 by means of a bearing 40 around a shaft 41 welded to the lid 5.

After the driving gear assembly 63 has been mounted in the trough or channel 4 and the lid 5 of the housing 3 are welded together so that neither the coupling gear wheels 11 nor the driving gear wheels 10 are any longer accessible for being dismounted. If in operation the driving gears 63 is damaged, for example, due to a break-down of a tooth of a gear wheel 10 or 11, the housing 3 is disengaged from the cutting members 7 and from the auxiliary frame 24 and is replaced by a new housing 3, which constitutes a repair unit.

Figure 6:
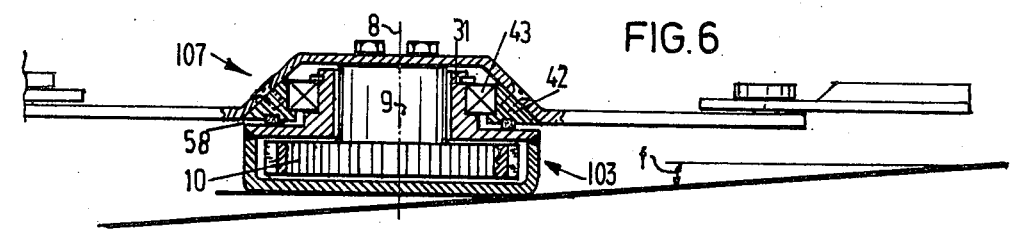
FIG. 6 is a sectional view illustrating a modified form of drive gear arrangement.

FIG. 6 shows as a variant of FIG. 4 that the cutting 107 is journalled by means of a ring 42 and a bearing 43 on the outer side of the collar 31 on the housing 103.

Figure 7:
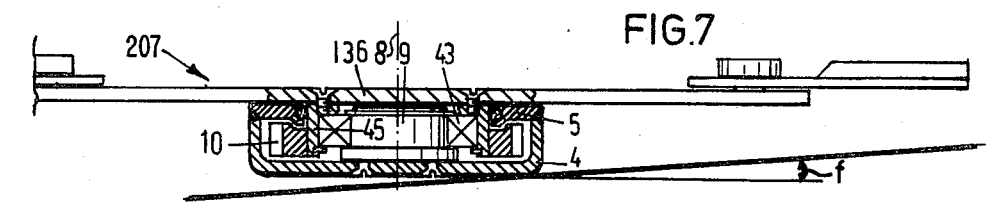
FIG. 7 is a sectional view illustrating a modified form of drive gear arrangement.

The cutting member 207 of FIG. 7 comprises a holder in the form of a completely flat disc 136 and a ring 45 secured to the bottom side thereof and fastened by press fit in a gear 10 and journalled by means of a bearing 43 on a shaft 9 secured to the trough 4.

The cutting member 307 of FIG. 8 is identical with that shown in FIG. 7, but it is provided with a cover plate 46 so that the cutters 37 can rotate in the space 47 between the cover plate 46 and the disc 336.

In the cutting member 407 of FIG. 9 a similar space 47 is provided between the cover plate 46 and the disc 436.

Referring to FIG. 10 the holder of the cutting member 507 is formed by a hat-like disc 536 having a horizontal rim 48, to which struts 49 are welded. Each cutter 537 is adapted to turn about a collar 50 of the strut 49 by means of a resilient fastening member 44, which can be disengaged by a special key 51 by bending inwardly hooks 52 in a sleeve 53 of the key 51 and by subsequently pulling up the fastening member 44. The key 51 comprises a hook 54 engaging a recess 55 of the disc 536 (see FIG. 11).

Referring to FIG. 12 a hook 54 of a key 51 can grip around the outer side of the disc 36.

Each cutter 537 of FIG. 10 is twisted and bent so that in the position indicated by broken lines in this Figure it does not touch the top side of the disc 536.

Figure 13:
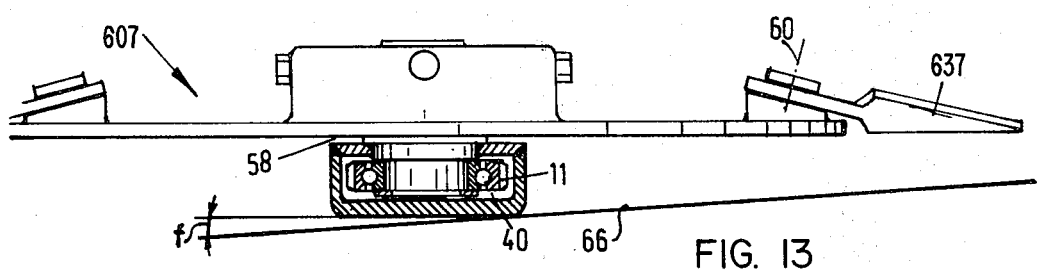
FIG. 13 is a sectional view illustrating a modified form of coupling gear arrangement.

FIG. 13 shows a cutting member 607, in which each cutter 637 like in FIG. 10 is capable of turning about an upright, outwardly inclined axis 60. The cutter 637 of FIG. 13 is, however, not bent as is the case with the cutter 527 of FIG. 10.

The cutters 637 shown are twisted so that they slightly lift the crop after cutting.

The gear 11 shown in FIG. 13 is formed by teeth cut in the outer ring of the roller, needle or ball bearing 40. Thus, if desired, gears 11 of even smaller diameters may be employed.

Figure 14:
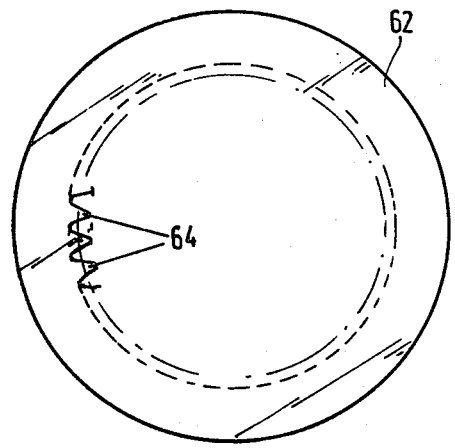
FIG. 14 is a plan view illustrating the preferred manner of milling the gears.
Figure 15:
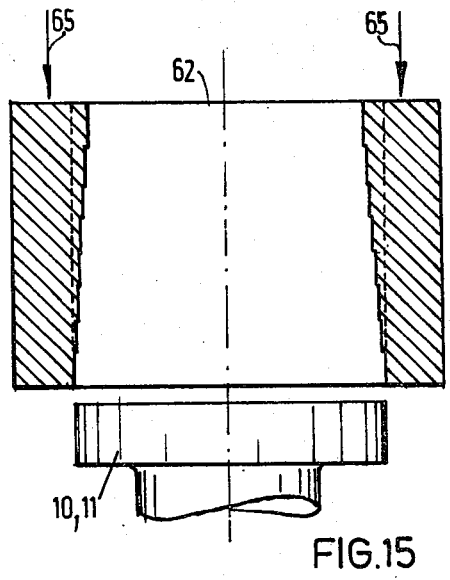
FIG. 15 is a sectional view illustrating the milling technique of FIG. 14.

The gears 10 and 11 are preferably identical. Because these gears are very small and manufactured in large numbers they can advantageously be manufactured by means of a rifling milling cutter 62 having internal toothing 64 (see FIGS. 14 and 15). The milling cutter 62 is then moved in the direction of the arrow 65 with respect to the gears 10, 11 to be produced.

In the plane of the rim 48, inside the disc 536 of FIG. 10, a sealing plate 56 is welded, which moves just past the lid 5 and which protects the space 57 from stones.

The embodiments of all FIGS. 4 to 13 have a stone-protecting gap 58 between the rotating cutting members and the non-rotating housing 3.

In all embodiments shown the mowing implement 1 has a low structure and the cutting members are shaped so that the mowing implement 1 readily moves beneath the cut crop. The circumferential speed of the cutters is very high, for example, about 80 ms/sec with a circumferential diameter e of 45 to 50 cms.

In operation the mowing implement 1 is held slightly inclined forwardly so that the cutting members 7 are at an angle f of the land level 66.

Figure 16:
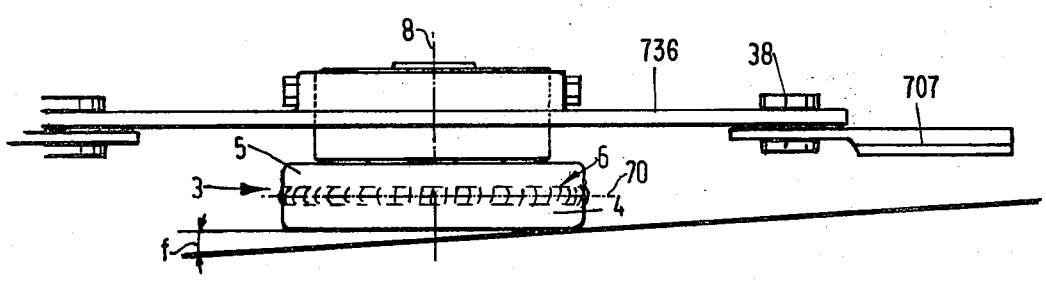
FIG. 16 is an elevational view illustrating a modified form of rotary cutter.

Referring to FIGS. 16, 17 and 18, the cutters 707, 807 and 907 are arranged on the bottom sides of the discs 736, 836 and 936. FIGS. 17 and 18 show that the cutters are located in parts 59 of the discs 836 and 936 and during its rotation the cutter of an adjacent disc passes by said disc 36 each time in an opening 61.

Referring to FIG. 16, the weld 6 is located in the neutral line 70 of the housing 3, which is advantageous with regard to the welding operation. As a matter of course, the weld 6 may be made beneath the neutral line 70.

In the mowing implement shown in FIG. 19 the housing 103 is formed as a seamless box, in which the trough 4 and the lid 5 are integral with one another. After the gears 10 and 11 have been mounted, each of the ends of the box-shaped housing is closed by an end wall 67 welded to the housing and having a screw cap 68 for the insertion of oil, as shown in FIG. 21.

The mowing implement shown in FIG. 20 is identical with that of FIG. 19, but the box-shaped profile has one welding seam 69.

The mowing implement of FIG. 21 comprises a housing 203 whose lid 5 and trough or channel 4 have welding rims 75 projecting slightly, for example, by 5 mms. These welding rims 75 facilitate the welding operation and scarcely contribute to the width of the housing.

FIGS. 23 to 27 show each a housing 303, 403, 503, 603 or 703 comprising lids 500, 501, 502, 503 or 504 and bottoms 703, 704, 705, 706 or 707 which are rigidly connected with one another by means of connecting means 76 extending through the bearing means of each coupling gear 11 of the driving gear 63. As a result the housing 3 has got an extra strong shape-firmness.

Referring to FIG. 23, the connecting means 76 comprise a hollow shaft 9 welded through a welding seam 77 to the lid 5 and through a welding seam 78 to the bottom 73. The bearing means consist of a ball bearing 40 closed between distance rings 79 and 80.

Referring to FIG. 24 the distance ring 80 is a collar which is rigidly connected with the shaft 9.

Referring to FIG. 25 the connecting means 76 are constituted by introverted parts 81 and 82 of the lid 5 and the bottom 73 respectively, said introverted parts 81 and 82 extending in the bearing means and being rigidly connected to one another by means of a welding seam 83. The bearing means are constituted by a ring of balls 84 having their rolling pathes 85 and 86 upon the introverted parts 81 and 82 and the coupling gear 11 respectively.

Referring to FIG. 26, the introverted parts 81 and 82 are connected to one another by means of a rolling welding seam 83. The introverted parts 81 and 82 are pressed into a conventional ball bearing 40.

The connecting means 76 of FIG. 27 comprise a disc 88 arranged between inwardly directed introverted parts 81 and 82 and connected to them by means of welding seams 87. In this embodiment the housing 703 has in spite of the introverted parts 81 and 82 a scarcely decreased resistance moment near each coupling gear 11.

What we claim is:

1. A mowing implement including auxiliary frame means adapted to be connected to a powered vehicle, drive coupling means carried by the auxiliary frame means for providing drive input from the powered vehicle to the mowing implement and a rotary cutter assembly adapted to be detachably mounted on said auxiliary frame means, said cutter assembly comprising:

an elongate housing detachably mounted at one end to said auxiliary frame means and extending therefrom in a direction transversely of the direction of movement of the implement;

a plurality of substantially identical and equally spaced driven gears accommodated serially within said housing longitudinally thereof and defining spaces therebetween;

a plurality of rotary cutting members each connected to a different driven gear in closely overlying relation to said housing, said cutting members defining cutting paths which overlap forwardly of said housing whereby the mowing implement is adapted to cut a swath of standing crop;

a plurality of idler gears substantially identical to each other, and to the driven gears, said plurality of idler gears being disposed within said housing in the spaces between the driven gears, each of said spaces being substantially filled by at least two pairs of idler gears when same are in intermeshing relationship with the driven gears so that each driven gear rotates in a direction counter to that of any adjacent driven gear; each connecting means being engaged by its associated bearing means to positively locate each bearing means longitudinally of the housing, each said connecting means comprising dished a shaft welded to the top and bottom wall portions of said housing;

a drive coupling member drivingly engaging that idler gear which is located at said one end of the housing;

said housing together with said gear defining a unit in which said housing inaccessibly encloses said idler and driven gears whereby the entire unit may be replaced in the event of damage thereto, said housing comprising top, bottom and side wall portions defining the inaccessible enclosure and said unit including bearing means captive within said inclosure positively locating and rotatably supporting said idler gears, and said housing including fixed connecting means extending through the bearing means of each idler gear for fixedly interconnecting and joining said top and bottom wall portions of said housing.

2. A mowing implement including auxiliary frame means adapted be connected to a powered vehicle, drive coupling means carried by the auxiliary frame means for providing drive input from the powered vehicle to the mowing implement and a rotary cutter assembly adapted to be detachably mounted on said auxiliary frame means, said cutter assembly comprising:

an elongate housing detachably mounted at one end to said auxiliary frame means and extending therefrom in a direction transversely of the direction of movement of the implement;

a plurality of substantially identical and equally spaced driven gears accommodated serially within said housing along the longitudinal axis and defining spaces therebetween;

a plurality of rotary cutting members each connected to a different driven gear in closely overlying relation to said housing, said cutting members defining cutting paths which overlap forwardly of said housing whereby the mowing implement is adapted to cut a swath of standing crop;

a plurality of idler gears substantially identical to each other, and to the driven gears, said plurality of idler gears being disposed within said housing in the spaces between the driven gears, each of said spaces being substantially filled by at least two pair of idler gears when same are in intermeshing relationship with the driven gears and with driven gear to rotate in a direction counter to that of the adjacent driven gears;

a drive coupling member drivingly engaging that idler gear which is located at said one end of the housing;

said housing together with said gear defining a unit in which said housing inaccessibly encloses said idler and driven gears whereby the entire unit may be replaced in the event of damage thereto, said housing comprising top, bottom and side wall portions defining the inaccessible enclosure and said unit including bearing means captive within said inclosure positively locating and rotatably supporting said idler gears, and said housing including fixed connecting means extending through the bearing means of each idler gear for fixedly interconnecting and joining said top and bottom wall portions of said housing, each connecting means being engaged by its associated bearing means to positively locate each bearing means longitudinally of the housing, each said connecting means comprising dished areas of said top and bottom wall portions.

3. In a mowing implement as defined in claim 2 wherein said dished areas of each connecting means engage each other and are welded together.

4. In a mowing implement as defined in claim 2 wherein each bearing means includes an inner bearing race member sandwiched between and welded to said dished areas of its associated connecting means.

5. In a mowing implement as defined in claim 3 wherein each dished area is of frusto-conical shape and wherein the dished areas of each connecting means are surrounded by the associated bearing means and are engaged in clamping relation therewith.

6. A mowing implement adapted to be connected to a powered vehicle having drive coupling means for providing drive input from the powered vehicle to the mowing implement, said mowing implement comprising:

an elongate housing and at least a pair of spaced driven gears accommodated serially within said housing longitudinally thereof;

a rotary cutting member connected to each driven gear in closely overlying relation to said housing, said cutting members defining cutting paths which overlap forwardly of said housing whereby the mowing implement is adapted to cut a swath of standing crop; and a plurality of idler gears disposed within said housing in the space between the driven gears;

said housing together with said gears defining a unit in which said housing encloses said idler and driven gears whereby the entire unit may be replaced in the event of damage thereto, said housing comprising top, bottom and side wall portions defining the enclosure and said unit and including bearing means captive within said enclosure positively locating and rotatably supporting said idler gears, and said housing including fixed connecting means extending through the bearing means of each idler gear for fixedly interconnecting and permanently joining said top and bottom wall portions of said housing, each connecting means being engaged by its associated bearing means to positively locate each bearing means longitudinally of the housing, each said connecting means comprising a shaft welded to the top and bottom wall portions of said housing.

7. A mowing implement adapted to be connected to a powered vehicle having drive coupling means for providing drive input from the powered vehicle to the mowing implement, said mowing implement comprising:

an elongate housing and at least a pair of spaced driven gears accommodated serially within said housing longitudinally thereof;

a rotary cutting member connected to each driven gear in closely overlying relation to said housing, said cutting members defining cutting paths which overlap forwardly of said housing whereby the mowing implement is adapted to cut a swath of standing crop; and a plurality of idler gears disposed within said housing in the space between the driven gears;

said housing together with said gears defining a unit in which said housing encloses said idler and driven gears whereby the entire unit may be replaced in the event of damage thereto, said housing comprising top, bottom and side wall portions defining the enclosure and said unit and including bearing means captive within said enclosure positively locating and rotatably supporting said idler gears, and said housing including fixed connecting means extending through the bearing means of each idler gear for fixedly interconnecting and permanently joining said top and bottom wall portions of said housing, each connecting means being engaged by its associated bearing means to positively locate each bearing means longitudinally of the housing, each said connecting means comprising dished areas of said top and bottom wall portions.

8. In the mowing implement as defined in claim 7 wherein said dished areas of each connecting means engage each other and are welded together.

9. In a mowing implement as defined in claim 7 wherein each bearing means includes an inner bearing race member sandwiched between and welded to said dished areas of its associated connecting means.

10. In a mowing implement as defined in claim 8 wherein each dished area is of frusto-conical shape and wherein the dished areas of each connecting means are surrounded by the associated bearing means and are engaged in clamping relation therewith.

11. A mowing implement including auxiliary frame means adapted to be connected to a powered vehicle, a rotary cutter assembly adapted to be detachably connected to said auxiliary frame, and drive means carried by said auxiliary frame for providing drive input from the powered vehicle to said cutter assembly, said cutter assembly comprising:

an elongate housing having one end thereof provided with a top opening, a drive input gear located within said one end of the housing substantially in registry below said opening;

at least two driven gears rotatably carried by said housing, a stub shaft connected to each driven gear and projecting upwardly through said housing, said driven gears being spaced serially longitudinally of the housing to define spaces therebetween, and that driven gear closest to said drive input gear also being spaced therefrom to define a space between such driven gear and said drive input gear;

a plurality of rotary cutting members each connected to a different one of said stub shafts in closely overlying relation to said housing, said cutting members defining cutting paths which overlap forwardly of said housing; and a plurality of idler gears permanently rotatably mounted in said housing and comprising a plurality of sets of serially meshing idler gears in which each set is disposed in a different one of said spaces to establish a serially intermeshed drive between said drive input gear and all of said driven gears;

said housing comprising permanently joined top, bottom and opposite side wall portions defining an enclosure within which said drive input, driven and idler gears are housed and said opposite side wall portions being closely spaced to accommodate said gears whereby said housing is of narrow width, said housing and gears defining a unit which may be replaced in the event of damage thereto and said unit including bearing means captive within said enclosure positively locating and rotatably supporting said idler gears, and said housing including fixed connecting means extending through the bearing means of each idler gear for fixedly interconnecting and permanently joining said top and bottom wall portions of said housing, each said connecting means comprising a shaft welded to the top and bottom wall portions of said housing.

12. A mowing implement including auxiliary frame means adapted to be connected to a powered vehicle, a rotary cutter assembly adapted to be detachably connected to said auxiliary frame, and drive means carried by said auxiliary frame for providing drive input from the powered vehicle to said cutter assembly, said cutter assembly comprising:
   an elongate housing having one end thereof provided with a top opening, a drive input gear located within said one end of the housing substantially in registry below said opening;
   at least two driven gears rotatably carried by said housing, a stub shaft connected to each driven gear and projecting upwardly through said housing, said driven gears being spaced serially longitudinally of the housing to define spaces therebetween, and that driven gear closest to said drive input gear also being spaced therefrom to define a space between such driven gear and said drive input gear;
   a plurality of rotary cutting members each connected to a different one of said stub shafts in closely overlying relation to said housing, said cutting members defining cutting paths which overlap forwardly of said housing; and
   a plurality of idler gears permanently rotatably mounted in said housing and comprising a plurality of sets of serially meshing idler gears in which each set is disposed in a different one of said spaces to establish a serially intermeshed drive between said drive input gear and all of said driven gears;
   said housing comprising permanently joined top, bottom and opposite side wall portions defining an enclosure within which said drive input, driven and idler gears are housed and said opposite side wall portions being closely spaced to accommodate said gears whereby said housing is of narrow width, said housing and gears defining a unit which may be replaced in the event of damage thereto and said unit including bearing means captive within said enclosure positively locating and rotatably supporting said idler gears, and said housing including fixed connecting means extending through the bearing means of each idler gear for fixedly interconnecting and permanently joining said top and bottom wall portions of said housing, each said connecting means comprising dished areas of said top and bottom wall portions.

13. In a mowing implement as defined in claim 12 wherein said dished areas of each connecting means engage each other and are welded together.

14. In a mowing implement as defined in claim 12 wherein each bearing means includes an inner bearing race member sandwiched between and welded to said dished areas of its associated connecting means.

15. In a mowing implement as defined in claim 13 wherein each dished area is of frusto-conical shape and wherein the dished areas of each connecting means are surrounded by the associated bearing means and are engaged in clamping relation therewith.

* * * * *